United States Patent [19]

Biber

[11] 4,341,447

[45] Jul. 27, 1982

[54] INFRARED CAMERA RANGING SYSTEM

[75] Inventor: Conrad H. Biber, Needham, Mass.

[73] Assignee: Polaroid Corporation, Cambridge, Mass.

[21] Appl. No.: 211,639

[22] Filed: Dec. 1, 1980

[51] Int. Cl.³ .............................................. G03B 7/08
[52] U.S. Cl. .................................... 354/25; 354/195; 356/4
[58] Field of Search ...................... 354/25, 25 A, 195; 356/4

[56] References Cited

U.S. PATENT DOCUMENTS

| | | | |
|---|---|---|---|
| 3,274,914 | 9/1966 | Biedermann et al. | 354/25 |
| 3,435,744 | 4/1969 | Stimson | 354/25 A |
| 4,078,171 | 3/1978 | Stauffer | 354/25 |
| 4,178,098 | 12/1979 | Asano et al. | 354/25 |
| 4,189,232 | 2/1980 | Asano et al. | 354/25 |

*Primary Examiner*—Russell E. Adams
*Attorney, Agent, or Firm*—David R. Thornton

[57] ABSTRACT

A passive infra-red ranging system for a photographic camera or the like includes two infra-red responsive sensors spaced apart a predetermined distance from one another on the camera body. Each sensor includes a plurality of vertically aligned segments which receive a portion of the infra-red radiation emitted from the subject(s) of principal interest. In one embodiment, the segments of the two sensors are scanned in a successive serial manner by scanning circuitry with the composite output of each sensor analyzed to identify the maxima(s) associated with the subject(s) of principal interest. Computing circuitry determines the angular relationship between the subject(s) and each sensor to permit calculation of the distance-to-subject range by triangulation. In another embodiment, one of the two sensors is angularly adjusted until the scanning circuitry detects "coincidence" between the image of a given subject on each sensor thereby permitting computation of the distance-to-subject range by triangulation.

8 Claims, 14 Drawing Figures

INFRARED CAMERA RANGING SYSTEM

BACKGROUND OF THE INVENTION

The present invention relates to an auto-ranging apparatus for use with photographic cameras for determining the distance-to-subject range and, more particularly, to an auto-ranging apparatus that utilizes infra-red radiation emitted by the subject(s) of principal interest for determining the distance-to-subject range.

Motion picture and still picture cameras are typically focused by manual adjustment of the camera lens while viewing a focus indicator such as the split-image screen provided in so-called range finder cameras and the focusing screen provided in single lens reflex cameras. Automatic focusing systems have been developed which permit the camera to auto focus, that is, determine the distance-to-subject range without intervention of the camera operator. These automatic systems have included, for example, infra-red ranging systems and sonic ranging systems. The infra-red systems typically include a source of infra-red energy which irradiates the subject(s) of principal interest with infra-red radiation. An infra-red responsive sensor measures the radiation reflected from the subject(s) with the output of the sensor used to set the lens focus. In the sonic systems, a pulse of sonic energy is directed in the direction of the subject(s) and the time interval between the transmission of the irradiating pulse and the reception of the reflected energy is measured to determine the distance-to-subject range. Both of these systems are of the active type in that the camera must emit irradiating energy in the general direction of the subject(s) of principal interest in order to determine the subject range.

It is a principal object of the present invention, among others, to provide an auto-ranging system for a still or motion picture camera which accurately and efficiently determines the distance-to-subject range without the need for an irradiating energy source in the camera.

It is another object of the primary invention to provide an auto-ranging system for a camera which is both simple to operate and inexpensive to manufacture.

In accordance with these objects and others, the present invention provides a passive infra-red ranging system for a photographic camera or the like which includes two infra-red responsive sensors spaced apart from one another and oriented in the direction of the scene to be photographed. Each sensor is divided into a plurality of individual infra-red responsive segments with each segment receiving a portion of the radiation emitted from the scene and providing an appropriate output therefrom. In one embodiment, a scanning and computing circuit cyclically and successively scans the segments of both sensors and stores the output information for amplitude comparison to determine the angular relationship between the various segments on both sensors and the subject(s) of principal interest. This angular relationship information is then used to determine the distance-to-subject range by triangulation. In another embodiment of the present invention, one of the two sensors is angularly adjustable relative to the other to permit the camera operator to aim the adjustable sensor in the direction of the subject of principal interest. Scanning circuitry cyclically scans the outputs of the sensor segments and determines when coincidence occurs between the fixed and adjustable sensors to permit computing circuitry to determine the distance-to-subject range by triangulation.

The present invention advantageously permits a camera user to determine the range of the subject(s) of principal interest under low light conditions using energy emitted from the subject itself. The invention is especially useful in low light portraiture and in photographing heat emitting machinery when it is desired to range on the portion thereof having the greatest infra-red energy emission.

DESCRIPTION OF THE DRAWINGS

FIG. 1B illustrates the position of the images of the first and second subjects of FIG. 1 on the radiation receiving face of the right-hand sensor;

DESCRIPTION OF THE PREFERRED EMBODIMENT

Figure 3A:
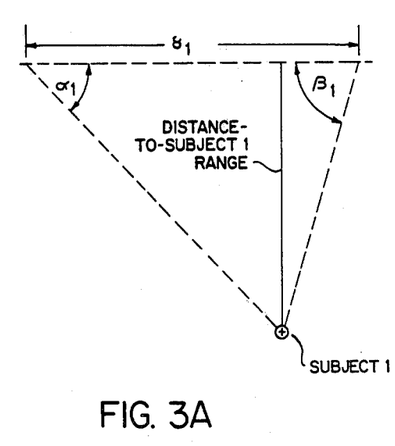
FIG. 3A illustrates the triangulation geometry for determining the distance-to-subject range of the first subject of FIG. 1.
Figure 4:
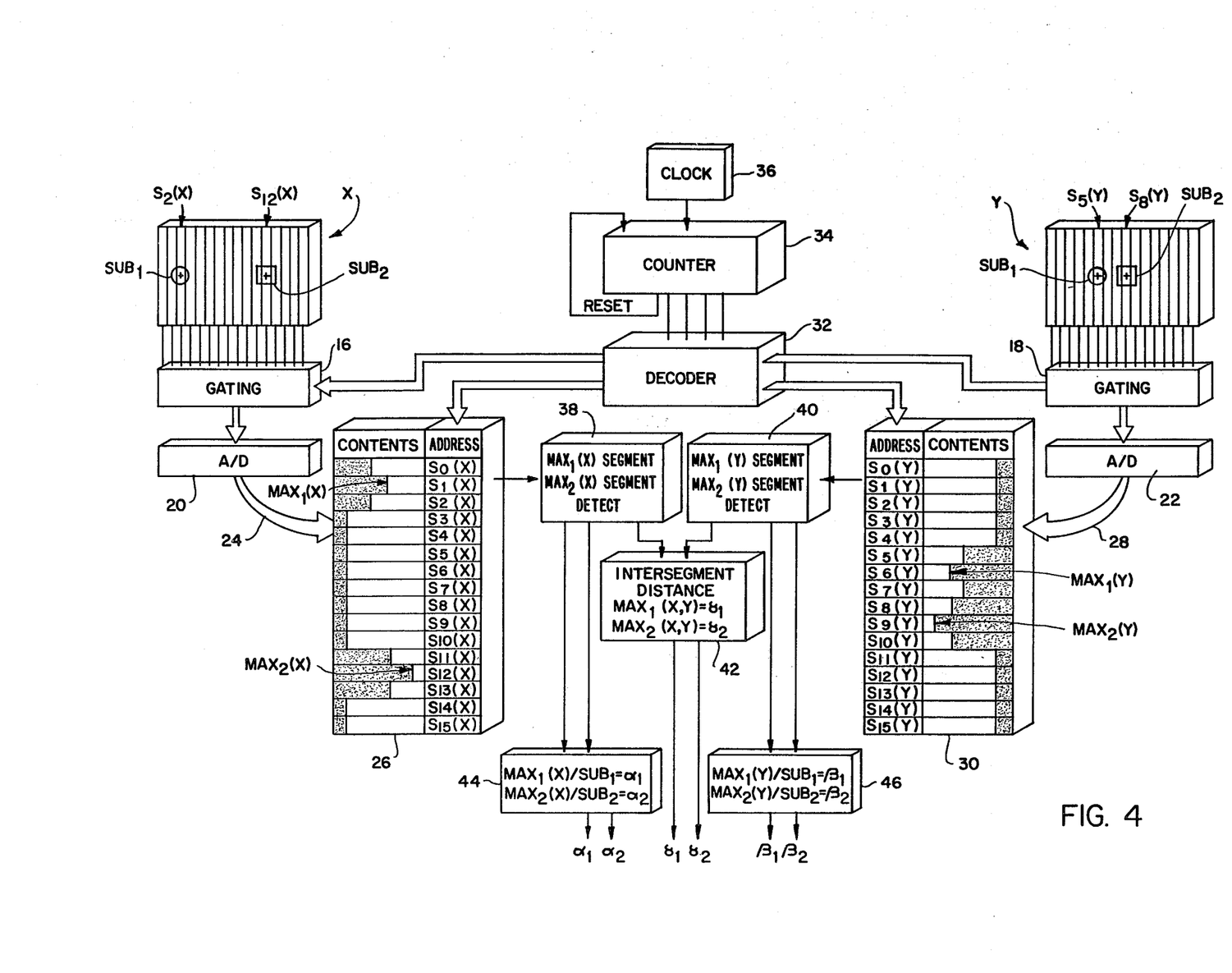
FIG. 4 illustrates a scanning and processing circuit for processing the signal outputs of the left and right-hand sensors of FIG. 1.
Figure 4A:
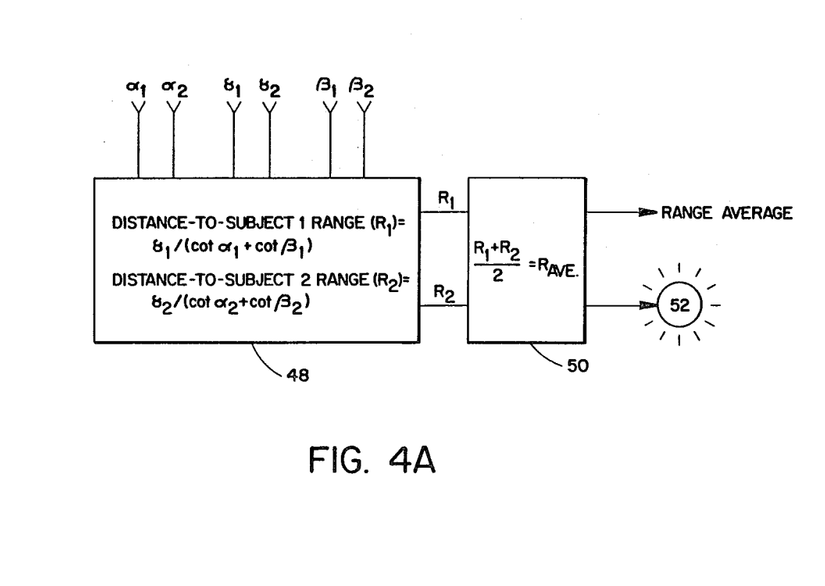
FIG. 4A illustrates a computation circuit for utilizing the information provided by the circuit of FIG. 4 to determine the average range to the subjects shown in FIG. 1.

A first embodiment of a passive infra-red ranging system is shown in FIGS. 1–4A with FIGS. 1–3A illustrating the ranging geometry and the infra-red sensor characteristics of the system and FIGS. 4 and 4A schematically illustrating a preferred circuit for effecting the distance-to-subject range determination. In accordance with the present invention, two infra-red sensor members X and Y (FIG. 1) are mounted on the body of a still or motion picture photographic camera (not shown) and spaced apart from one another a predetermined distance along a base line 10. The sensor X is provided with a low-loss infra-red optical lens or lenses 12 (dotted line illustration) that provides means for imaging a subject in the field of view onto the radiation receiving surface of the sensor X. In a like manner, low-loss infra-red optical lens or lenses 14 is provided for the sensor Y. Hence, sensors X and Y, in conjunction with the lenses 12 and 14, provide means for sensing radiation from one or more subjects in the scene to be photographed.

Figure 1:
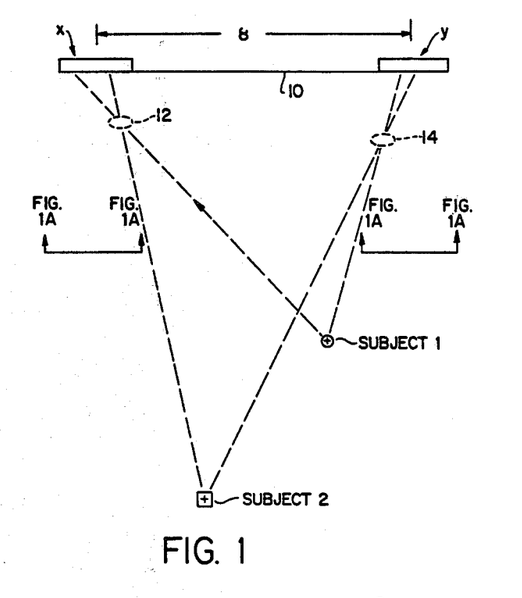
FIG. 1 schematically illustrates the ranging geometry of a first embodiment of the present invention when ranging on two subjects within the scene.

As shown in FIG. 1, when the ranging system is aimed or otherwise directed toward a field of view having first and second subjects, $SUB_1$ and $SUB_2$, images of those subjects are directed by the associated optics 12 and 14 to the sensors X and Y. The location that the image of any subject assumes on the radiation receiving surface of a sensor depends upon the distance-to-subject range and the location of the subject within the field of view, that is, whether the subject is directly on center between the sensors, left of center, or right of center. For example and as shown by the ray diagram of FIG. 1 and frontal view of the sensors in FIGS. 1A and 1B, the image of the first subject $SUB_1$ will fall far to the left of center on sensor X and only slightly to the left of center on sensor Y because of the location of the first subject in the field of view and its distance from the camera. On the other hand, the image of the second subject $SUB_2$ will fall to the right of center on sensor X and approximately on center on sensor Y. In general, for a subject optically aligned between the two sensors, the image of that subject on the sensors will converge towards one another for increasing range and diverge away from one another with decreasing range as shown by the appropriately labelled arrows in FIGS. 1A and 1B with the image location further affected by the position of the subject within the field of view. In FIG. 1, the lens 12 is shown to the right of center for the sensor X and the lens 14 is shown to the left of center for the sensor Y; it being assumed that the camera will be aimed in such a manner that the subject or subjects will be aligned between the sensors for purposes of ranging. As can be appreciated, however, the lenses 12 and 14 can be located on center relative to their respective sensors for those applications in which between-the-sensor aiming is not desired.

Figure 1A:
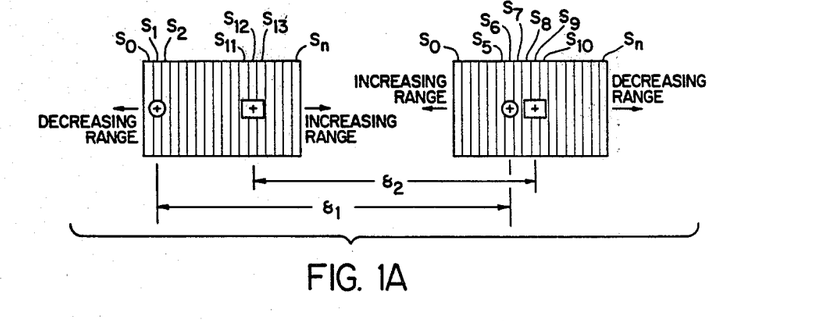
FIG. 1A illustrates the position of images of the first and second subjects in FIG. 1 on the radiation receiving face of the left-hand sensor.
Figure 2:
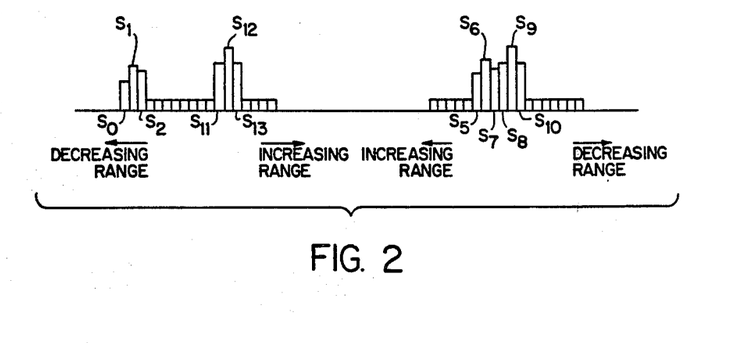
FIG. 2A illustrates the voltage output of the lefthand sensor of FIG. 1A in response to the imaging of the first and second subjects of FIG. 1.
FIG. 2B illustrates the voltage output of the right-hand sensor of FIG. 2A in response to the imaging of the first and second subjects of FIG. 1.

In the preferred embodiment, as shown in FIGS. 1A and 1B, each infra-red sensor has a rectangular radiation receiving surface that is further divided into n vertically aligned radiation receiving segments $S_0, S_1, \ldots S_{n-1}, S_n$ of substantially equal response characteristic and area, and with the radiation responsive output of each strip being separately available. For purposes of illustration, n is selected as sixteen although more or less segments can be utilized depending upon the ranging resolution desired. The sensors X and Y may by fabricated by mounting n sensing segments of a planar surface or fabricating the sensors as a unitary element with the separate segments formed on a substrate during manufacturing. The infra-red sensors X and Y are the type that provide an output that is a function of or responsive to the incident infra-red radiation. These could, of course, be responsive to a broad range of radiation but include appropriate filtering to transmit essentially infrared. The output may be photovoltaic, that is, the sensors generate a voltage output in response to the incident infra-red radiation, or photoconductive, that is, change their conductivity in response to a change in the incident infra-red radiation. In the latter case, the radiation responsive photosensitivity is utilized with an amplifier and a power supply to provide a voltage-responsive output signal. A commercially available infra-red responsive sensor suitable for use in the present invention is an assembled array of cells, each being the model PPC-522C infra-red cell manufactured by the Plessy Company.

The images of the subjects are directed by the sensor's associated optics onto the radiation receiving face of the sensor with each image generally falling in a group of adjacent segments. For example, in FIG. 1A the image of the first subject $SUB_1$ on the sensor X is shown distributed across the segments $S_0$, $S_1$, or $S_2$ while the image of the second subject $SUB_2$ on the sensor X is shown distributed across the segments $S_{11}$, $S_{12}$, and $S_{13}$. In a similar manner, the image of the first subject, $SUB_1$ on the sensor Y is shown distributed across the segments $S_5$, $S_6$, and $S_7$ and the image of the second subject $SUB_2$ on the sensor Y is shown distributed across the segments $S_8$, $S_9$, and $S_{10}$.

A graphical representation of the voltage output of the various infra-red responsive segments for the sensor X of FIG. 1A and the sensor Y of FIG. 1B is shown, respectively, in FIGS. 2A and 2B. In FIG. 2A, the voltage output for the first subject $SUB_1$ image on the sensor X is distributed across the segments $S_0$, $S_1$, and $S_2$ with the maxima occurring at the segment $S_1$, and the voltage output for the second subject $SUB_2$ image on the sensor X is distributed across segments $S_{11}$, $S_{12}$, and $S_{13}$ with the maxima occurring at the segment $S_{12}$. In a like manner, the voltage output for the first subject $SUB_1$ on the sensor Y is distributed across stripes $S_5$, $S_6$, and $S_7$ with the maxima occurring at $S_6$, and the voltage output for the second subject $SUB_2$ image on the sensor Y is distributed across stripes $S_8$, $S_9$, $S_{10}$ with the maxima occurring at stripe $S_9$. The output of the remaining infra-red responsive segments is below that of those aforementioned segments upon which the first and second subjects are imaged with their outputs representing background infra-red radiation from the scene to be photographed.

As explained more fully below, the distance-to-subject range determination is effected using an adjusted base line 10 and angular value determinations for the angles between the subjects and the sensors X and Y. Since the separation of the sensors X and Y along the base line 10 and the segment-to-segment separation is predetermined, the distance along the base line 10 between the segment of the sensor X and the corresponding segment of the sensor Y at which maximum output occurs for the first subject $SUB_1$ (that is, segment $S_1$ on the sensor X and segment $S_6$ on sensor Y) is known, and hence, an adjusted base line distance $\delta_1$ (the distance between images of subject 1) can be determined for the first subject $SUB_1$. In a similar manner, an adjusted base line distance $\delta_2$ can be determined for the second subject $SUB_2$ based on the distance between that segment on the sensor X and the corresponding segment on the sensor Y at which the maximum for the second subject $SUB_2$ occurs (that is, stripe $S_{12}$ on sensor X and stripe $S_9$ on sensor Y).

The manner in which the distance-to-subject range information is determined is shown in the triangulation chart of FIG. 3A in which the adjusted base line distance $\delta_1$ represents the distance between those segments on the sensors X and Y at which the maxima occurs for the first subject $SUB_1$ and the angle $\alpha_1$ represents the angle between the plane of a sensor X and the first subject $SUB_1$ and the angle $\beta_1$ represents the angle between the sensor Y and subject $SUB_1$. The range information is then determined from the following equation:

$$\text{RANGE } (R_1) = \delta_1/(\cot \alpha_1 + \cot \beta_1) \qquad \text{EQ.1:}$$

Figure 3B:
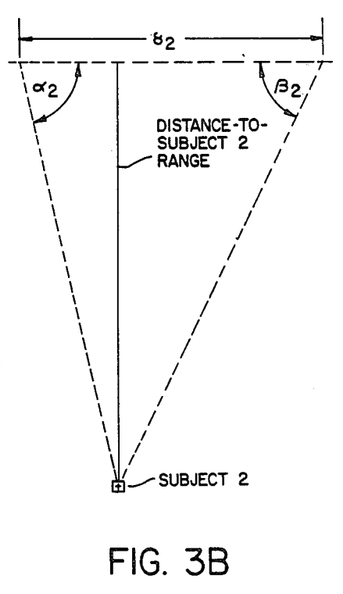
FIG. 3B illustrates the triangulation geometry for determining the distance-to-subject range for the second subject of FIG. 1.

In a similar manner, the range to the second subject $SUB_2$ can be determined as shown in FIG. 3B using the adjusted base line $\delta_2$ for the second subject $SUB_2$ and the angle $\alpha_2$ and $\beta_2$ defined between the sensors X and Y using the following equation:

$$\text{RANGE } (R_2) = \delta_2/(\cot \alpha_2 + \cot \beta_2) \qquad \text{EQ.2:}$$

An exemplary control circuit for determining the distance-to-subject range is shown in FIGS. 4 and 4A. The circuit includes the aforedescribed sensors X and Y each of which has its parallel outputs connected to a selectively operable switching or gating circuit 16 and 18, respectively. The gating circuits 16 and 18 are, in turn, connected to analog to digital converters (A/D) 20 and 22, respectively. The output of the analog to digital converter 20 is connected through a data buss 24 to a memory 26 and, in a like manner, the output of the analog to digital converter 22 is connected through a data buss 28 to another memory 30. A decoder 32 has its control output lines connected to the gating circuits 16 and 18 and to the memories 26 and 30. The decoder 32 has its parallel inputs connected to the outputs of a counter 34, which, in turn, receives its input from the system clock 36.

In operation, the system clock 36 provides a pulse train at a selected frequency to the counter 34 which counts the pulses in a sequential manner until a predetermined count (e.g., 16) is reached at which time the counter resets to zero to start another count cycle. The decoder 32, operating under the control of the counter 34, provides control signals to the gating circuit 16 which causes the gating circuit to gate the output of the radiation responsive segments $S_0, S_1, \ldots S_{15}$ of the sensor X to the analog to digital converter 20 in a successive serial manner. Substantially simultaneously with the operation of the gating circuit 16, the decoder 32 is providing signals to the address buss of the memory 26 to cause the memory to access, in a successive serial manner, the memory locations in which the digitized output of each segment of the sensor X is stored. In a similar manner, the decoder 32 provides the necessary control signals to the gating circuit 18 and to the memory address of the memory 30 so that the digital values corresponding to the output of the various segments of the sensor Y are stored in the appropriate memory locations. As can be appreciated, the output of the sensors X and Y are cyclically scanned with the output of each scanned segment being digitized and stored in appropriate memory locations in the memories 26 and 30. Thus, with each scanning cycle, the memories 26 and 30 contain digital information corresponding to the radiation-responsive outputs of the various segments of the X and Y sensors. In FIG. 4, the contents of the memory locations for the memories 26 and 30 have been symbolically shown in bar graph form with the magnitude of each graph corresponding to the output of the associated segment for the sensors X and Y with the subjects $SUB_1$ and $SUB_2$ imaged as shown.

The data outputs of the memories 26 and 30 are connected, respectively, to maximum value detectors 38 and 40. The detectors 38 and 40 are similarly constructed and are designed to scan the memory locations of the associated memories 26 and 30 and identify those locations having comparative maximum values. For example, in the case of the memory 26 in FIG. 4, the detector 38 will identify segments $S_1$ and $S_{12}$ as maximas and, in the case of the memory 30, the detector 40 will identify segments $S_6$ and $S_9$ as maximas.

Once the first and second maximum values for each of the memory locations in the memories 26 and 30 have been determined, respectively, by the detectors 38 and 40, these values are provided to intersegment distance determination circuits 42 such as coincidence detectors and adder arrangements which first amplitude matches the maximum values from the memories 26 and 30 to determine which maximum values correspond to the first subject $SUB_1$ and which maximum values correspond to the second subject $SUB_2$. Amplitude matching the maximum values for the first and second subject is preferred since it is unlikely that any two subjects in a field of view will have identical emissivity. Once the amplitude matching has been completed, the adjusted base line distance $\delta_1$ for the first subject $SUB_1$ and the adjusted base line distance $\delta_2$ for the second subject $SUB_2$ is determined from a knowledge of the inter-segment spacing of each sensor by adding the segmental distances needed to reach the image segment to the spacing of the sensors X and Y along the base line 10. Angle determining converters 44 and 46 (which essentially provide angle look-up tables) are connected to the maximum value detectors 38 and 40, respectively. The angle determining converter 38 determines a value representative of the angle $\delta_1$ between the sensor X and the first subject $SUB_1$ and the angle $\delta_2$ between the sensor X and the second subject $SUB_2$. In a similar manner, the angle determining converter 46 determines a value representative of the angle $\beta_1$ between the sensor Y and the first subject $SUB_1$, and the angle $\beta_2$ between the sensor Y and the second subject $SUB_2$. As was discussed above in connection with FIGS. 1A and 1B, the position of the image of a subject on the sensors X and Y is a function, in part, of the angular relationship between the subject and the sensor; the angular relationship being known beforehand based on the optical characteristics of the system. The angle determination may be accomplished, for example, by a table look-up arrangement stored in the converters 38 and 40 which for image position input provides an angular output.

Hence, the clock 36, counter 34, decoder 32, gates 16 and 18, converters 20 and 22, memory registers 26 and 30, provide means for determining the position of the images on the sensors X and Y. The detectors 38 and 40, in cooperation with the just-noted elements, provide means for identifying the maximum response values of each sensor, while the distance determining circuits 42 provide means for matching the amplitudes of these response values so as to identify images of the same subject on both sensors and the separation of the same. Finally, the converters 44 and 46 provide means for converting the image position to the angle of the subject to each with respect to each sensor. Taken together, these elements provide means for comparing the position of the subject image on each sensor member as measured along the base line, and for determining the separation of the images of a given subject and the angular relationship between the given subject and each sensor.

Once the $\alpha_1$, $\alpha_2$, $\delta_1$, $\delta_2$, $\beta_1$ and $\beta_2$ information is determined by the circuitry of FIG. 4, the triangulation computer 48 (such as a microprocessor) shown in FIG. 4A determines the subject range in accordance with the equations EQ.1 and EQ.2 listed above. Thus, the computer 48 provides means for determining the distance to the subject by triangulation employing the separation of the images and the angular relationship to the sensors. Once the range to the first subject $SUB_1$ and the range to the second subject $SUB_2$ are determined, these values may then be averaged in averaging unit 50 to provide an average range for setting the camera focus. An indicator 52, as shown in FIG. 4A, may be provided in the viewfinder of the camera to indicate that the range computation has been effected.

Figure 5:
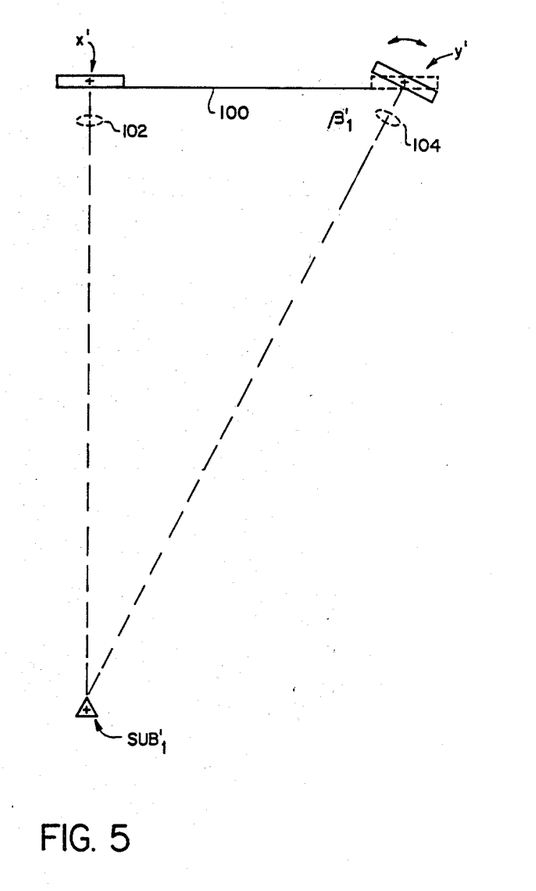
FIG. 5 schematically illustrates the ranging geometry of a second embodiment of the present invention when ranging on a single subject in which one of the sensors is fixed to the camera body and the other sensor is angularly adjustable by the camera user.
Figure 5A:
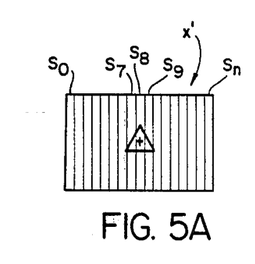
FIG. 5A illustrates the position of the image of the subject on the fixed, left-hand sensor of the system of FIG. 5.
Figure 5B:
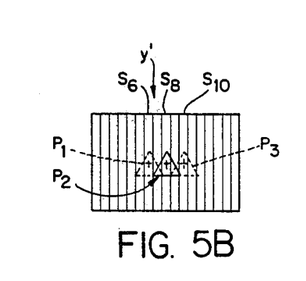
FIG. 5B illustrates the various positions of the image of the subject on the adjustable right-hand sensor of the system of FIG. 5.
Figure 6A:
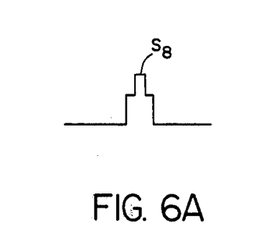
FIG. 6A illustrates the voltage output of the adjustable sensor of FIG. 5B.
Figure 6B:
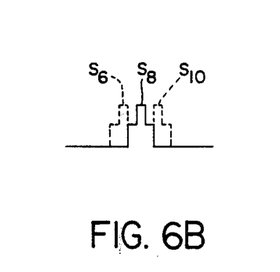
FIG. 6 illustrates the voltage output of the fixed sensor of FIG. 5A.
Figure 7:
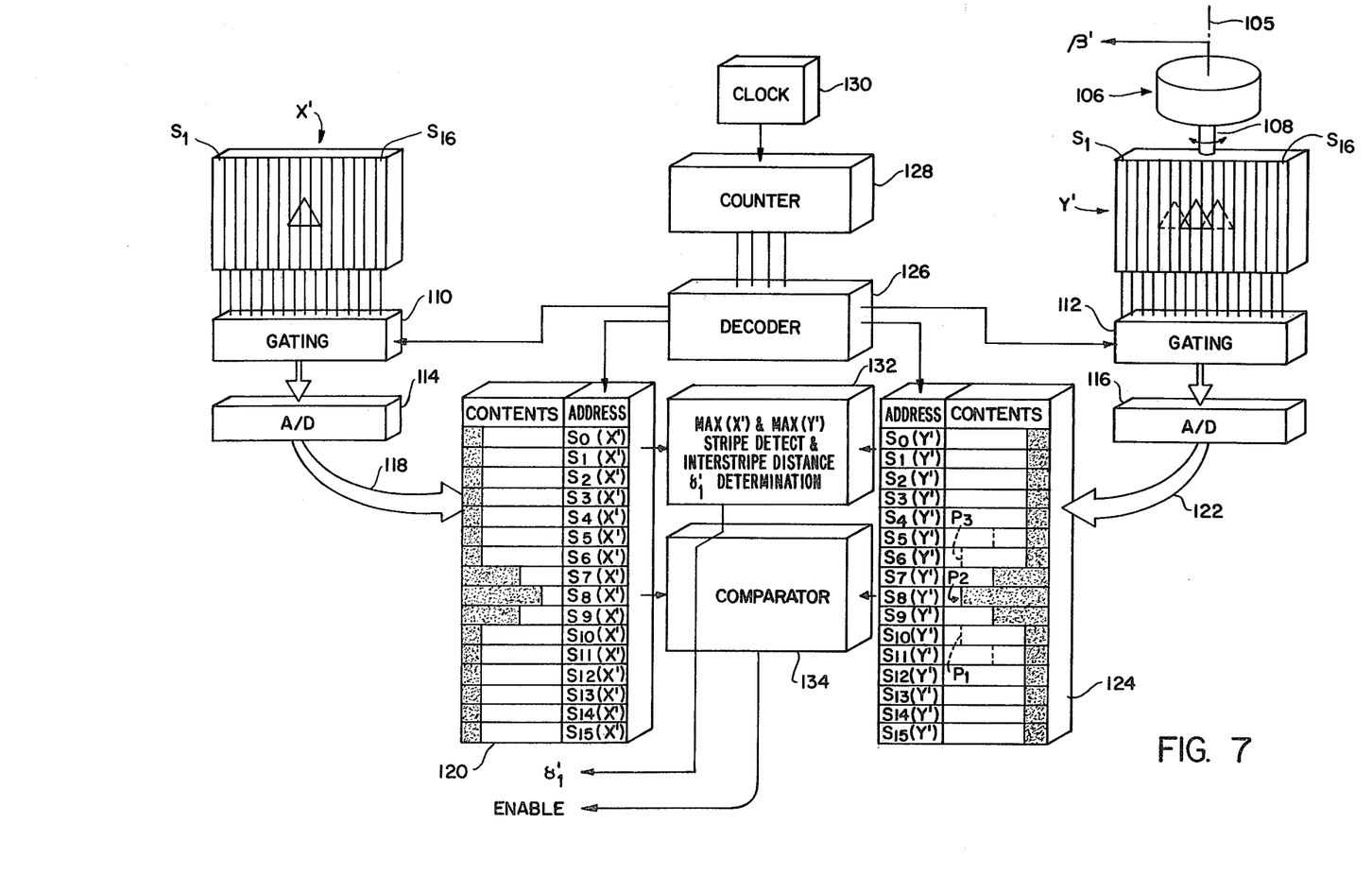
FIG. 7 illustrates a scanning and processing circuit for evaluating the voltage output of the fixed and adjustable sensors of the system of FIG. 5.
Figure 7A:
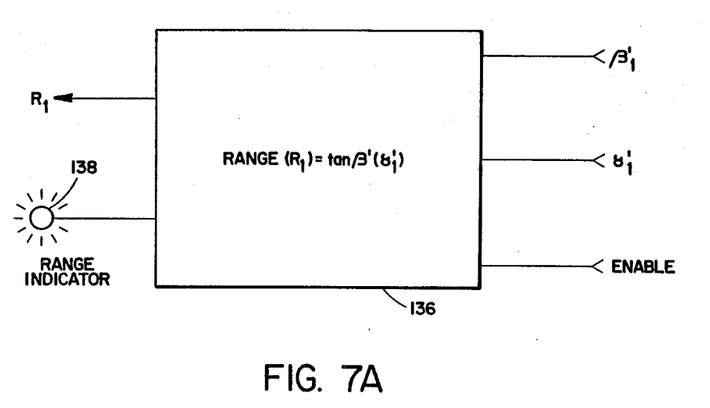
FIG. 7A is a schematic representation of a computing circuit for determining the distance-to-subject range by triangulation.

A second embodiment of an infra-red ranging system in accordance with the present invention is shown in FIGS. 5–7 with FIGS. 5–6B illustrating the ranging geometry and sensor operating characteristics and FIGS. 7 and 7A illustrating a circuit for effecting the ranging determination. In FIG. 5, two infra-red sensors X' and Y' are mounted on the camera body (not shown) and are spaced apart from one another a predetermined distance along a base line 100. The sensors X' and Y' are essentially of the same construction and have the same operating characteristics as the sensors X and Y described above in connection with the first embodiment of FIGS. 1–4A. The sensor X' is secured to the camera body while the sensor Y' is adjustably mounted on the camera to permit limited rotation of the sensor Y' about the vertical axis in response to manual operation of an aiming control (not shown).

When the camera is aimed toward a subject, for example, subject $SUB'_1$ in FIG. 5 using the camera view finder, the sensor X' receives a portion of the radiation emitted from the subject with this radiation imaged onto the radiation receiving face of the sensor X' through the associated optical elements 102. The image of the subject $SUB'_1$ shown in FIG. 5A, is distributed across several of the infra-red responsive segments with the segments providing a corresponding signal output, as shown in FIG. 6A. In the example of FIGS. 5 and 6, the image of the subject $SUB'_1$ is distributed across stripes $S_7$, $S_8$, and $S_9$ in FIG. 5A with the corresponding voltage output for these segments shown in FIG. 6A. While the camera is aimed at the subject $SUB'_1$, the sensor Y' is adjusted by the camera operator to also receive a portion of the infra-red energy radiated from the subject. The position that the image of the subject $SUB'_1$ assumes on the radiation receiving surface of the sensor Y' is dependent upon the angular orientation of the adjustable sensor Y' relative to the subject $SUB'_1$. As shown in FIG. 5B, the image of the subject $SUB'_1$ on the radiation receiving surface of the sensor Y' can take, for example, a position $P_1$, $P_2$, or $P_3$ with the sensor being properly adjusted when coincidence is effected between the image on the sensor X' and the image on the sensor Y'. In the example shown in FIGS. 5–6, coincidence is achieved when the image of the subject $SUB'_1$ is at position $P_2$ (maxima at $S_8$) on the radiation receiving surface of the sensor Y' as shown in the solid line illustration in FIG. 5B and out of coincidence when the image falls to the left or right (position $P_1$ or $P_3$, respectively) of the coincidence position as indicated by the broken line illustration of the subject $SUB_1'$ in FIG. 5B.

An exemplary control circuit for determining the distance-to-subject range is illustrated in FIGS. 7 and 7A. The circuit shown therein includes the aforedescribed sensors X' and Y' with the sensor X' secured to the camera body and the sensory Y' mounted for limited rotation about the vertical axis 105 of the camera. A angle transducer 106, such as a digital shaft encoder, is connected directly to the sensor Y' through a suitable connection to provide an output indication of the angular position of the sensor Y' relative to the camera body. The sensors X' and Y' each have their parallel outputs connected to a selectively operable switching or gating circuit 110 and 112 which, in turn, are connected to analog to digital converters 114 and 116, respectively. The output of the analog to digital converter 114 is connected through a data buss 118 to a suitable memory 120 and, in a like manner, the output of the analog to digital converter 116 is connected through a data buss 122 to a memory 124. A decoder 126 has control output lines connected to the gating circuits 110 and 112 and to the memories 120 and 124. The decoder 26 has its parallel inputs connected to the outputs of a counter 128, which in turn, receives its input from the system clock 130.

The circuit operates with the system clock 130 providing a pulse train at a selected frequency to the counter 128 which counts the pulses in a sequential manner until a predetermined count (e.g., 16) is reached at which time the counter 128 resets to zero to start another cycle. The decoder 126, operating under the control of the cycling counter 128, provides control signals to the gating circuit 114 which causes the gating circuit to gate the output of the radiation response segements $S_0$–$S_{15}$ of the sensor X' to the A/D converter 114 in a successiver serial manner. Substantially simultaneously with the gating of the circuit 110, the decoder 126 is providing signals to the address buss of the memory 120 to cause the memory to access, in a successive serial manner, those memory locations in which the digital output of each segment of the sensor X' will be stored. In a similar manner, the decoder 126 provides the necessary control signals to the gating circuit 112 and to the memory 124 so that digital values corresponding to the output of the various segments $S_0$–$S_{15}$ of the sensor Y' are stored in the appropriate memory locations. As can be appreciated, the output of the sensors X' and Y' are cyclically scanned with the output of each scanned segment digitized and stored in appropriate memory locations in the memories 120 and 124. Thus, with each scanning cycle, memories 120 and 124 contain digital information corresponding to the radiation responsive outputs of the various segments of the X' and Y' sensors. In FIG. 7, the contents of the various memory locations for the memories 120 and 124 have been symbolically shown in bar graph form with the magnitude of each bar graph corresponding to the associated segment of the sensors X' and Y' and for the images of the subject $SUB'_1$ shown thereon.

Both of the memories 120 and 124 are connected to a intersegment distance determining circuit 132 and to a comparator circuit 134. The intersegment distance determining circuit 132 operates in a manner similar to the circuit 42 described above in connection with the first embodiment in that the circuit 132 amplitude matches the maxima values in the memory locations of the memories 120 and 124 and identifies those locations in each memory that correspond to the subject $SUB'_1$ and provides an adjusted intersegment distance value $\delta_1'$. The comparator circuit 134 cyclically compares the memory locations of the memories 120 and 124 and provides an enable signal when coincidence is detected. In the example shown in FIG. 7, coincidence occurs when the outputs that represents the subject $SUB'_1$ in the memory 124 are in the same memory locations as the outputs that represent the subject $SUB'_1$ in the memory 120. The sensor Y' angular relationship $\beta'$ to the subject is provided by the angle transducer 106, the adjusted intersegment distance $\delta_1'$, and the enable signal are provided to a triangulation computer 136 (FIG. 7A) which determines the distance-to-subject range $R'_1$ in accordance with the following equation:

$$\text{RANGE } R'_1 = \text{Tan } \beta'_1(\delta_1') \qquad \text{EQ.3:}$$

As in the case of the first embodiment, a ranging indicator 138 (see FIG. 7A) may be provided in the view finder of the camera to indicate that ranging has been completed.

While in the embodiments described above, the infrared responsive segments of each sensor have been shown as vertically aligned, as can be appreciated by those skilled in the art, the segments may be aligned in a horizontal alignment or an oblique alignment and still be effective to determine the distance-to-subject range. While the sensors X and Y have been shown as electronically scannable, as also can be appreciated by those skilled in the art, electromechanical and mechanical scanning can be effected by using a slotted mask that is stepped across the sensor radiation receiving face or a rotating mirror arrangement to provide a similar scanning function.

As can be appreciated by those skilled in the art, various changes and modifications may be made to the present invention without departing therefrom as defined in the appended claims and their legal equivalent.

What is claimed is:

1. A passive ranging system for photographic apparatus, said system comprising:
   means for sensing infrared radiation emitted by one or more subjects in a scene to be photographed, said sensing means including first and second sensor members of given length spaced apart a predetermined distance in a given direction and means for imaging radiation from a subject on said sensor members;
   means for comparing the position of the subject image defined by said emitted radiation on each said sensor member as measured along said given direction and, in accordance therewith, determining the separation of said subject images along said given direction and the angular relationship between each sensor member and the subject forming such image; and
   means for determining the distance to said subject by triangulation employing said separation of said images and said angular relationship.

2. The system of claim 1 wherein one of said sensor members is mounted for pivotal movement around an axis normal to said given direction and the direction of ranging, and said comparing means includes means for determining the angular position of said one sensor relative to its said axis.

3. The system of claim 1 or 2 wherein said sensor members comprise a plurality of sensing segments arranged in given locations along said given direction.

4. The system of claim 1 wherein said sensor members comprise a plurality of sensing segments arranged in given locations along said given direction, and said comparing means includes means for serially scanning said sensing segments, for recording the radiation response values of each said segment, and means for comparing the values of each of said segments to determine the segments having a maximum value for each image such that, with the given spacing of said sensor members and the given width of said segments, the distance between said images and the angular relationship may be determined.

5. The system of claim 4 wherein said comparing means includes means for identifying and matching the maximum response values of each sensor member to identify the images of the same subject on each sensor member and for then determining the separation of said identified images in accordance with the separation of said sensor members and the segments at which such identified images provide a maxima.

6. A passive ranging system for photographic apparatus, said system comprising:
   means for sensing infrared radiation emitted by a subject in a scene to be photographed, said sensing means including first and second sensor members of a given length spaced apart a predetermined distance in a given direction and means for imaging radiation emitted by said subject on said sensor members, one of said sensor members being mounted for pivotal movement around an axis normal to said given direction and the direction of ranging;
   means for determining the position of said subject image on each said sensor member as measured along said given direction;
   means for comparing the position of the subject image on each said sensor member as measured along said given direction;
   means for pivoting said one sensor member until the position of said image thereon substantially corresponds to the position of said image on the other side of said sensor members;
   means for determining the separation of said subject images along said given direction and the angular position of said one member; and
   means for determining the distance to said subject by triangulation employing said separation of said images and said angular position of said one member.

7. The system of claim 6 wherein said sensor members comprise a plurality of sensing segments arranged in given locations along said given direction, and said comparing means includes means for serially scanning said sensing segments, for recording the radiation response values of each said segment, and means for comparing the values of each of said segments to determine the segments having a maximum value for each image such that, with the given spacing of said sensor members and the given width of said segments, the distance between said images and the angular relationship may be determined.

8. The system of claim 7 wherein said comparing means includes means for identifying and matching the maximum response values of each sensor member to identify the images of the same subject on each sensor member and for then determining the separation of said identified images in accordance with the separation of said sensor members and the segments at which such identified images provide a maxima.

* * * * *